US012209452B1

(12) United States Patent
Osborne

(10) Patent No.: US 12,209,452 B1
(45) Date of Patent: Jan. 28, 2025

(54) APPARATUS AND METHOD FOR MULLED WINDOW INSTALLATION

(71) Applicant: Wincore Window Company, LLC, Parkersburg, WV (US)

(72) Inventor: Troy L. Osborne, Parkersburg, WV (US)

(73) Assignee: Wincore Window Company, LLC, Parkersburg, WV (US)

( * ) Notice: Subject to any disclaimer, the term of this patent is extended or adjusted under 35 U.S.C. 154(b) by 0 days.

(21) Appl. No.: 18/348,594

(22) Filed: Jul. 7, 2023

(51) Int. Cl.

| | |
|---|---|
| ***E06B 1/60*** | (2006.01) |
| ***E06B 1/36*** | (2006.01) |
| ***E06B 3/30*** | (2006.01) |

(52) U.S. Cl.
CPC ............ *E06B 1/6007* (2013.01); *E06B 1/366* (2013.01); *E06B 1/60* (2013.01); *E06B 3/30* (2013.01)

(58) Field of Classification Search
CPC .......... E06B 1/6007; E06B 1/366; E06B 1/60; E06B 3/30; E06B 3/9642; E06B 3/9632; E06B 3/9687
See application file for complete search history.

(56) References Cited

U.S. PATENT DOCUMENTS

| | | | | |
|---|---|---|---|---|
| 3,837,128 A * | 9/1974 | O'Brien | E04B 2/82 | 52/282.2 |
| 5,363,625 A * | 11/1994 | Philippi | E04C 3/06 | 403/252 |
| 5,494,370 A * | 2/1996 | Habicht | E06B 3/9642 | 403/231 |
| 5,618,127 A * | 4/1997 | Tonsmann | E06B 3/9616 | 403/403 |
| 7,681,360 B2 * | 3/2010 | Daniels | E06B 3/44 | 49/63 |
| 10,760,329 B1 * | 9/2020 | Maas | E06B 3/9642 | |
| 11,684,180 B2 * | 6/2023 | Gomez | F25D 23/00 | 312/406 |
| 2011/0091269 A1 * | 4/2011 | Solly | E06B 3/9642 | 403/37 |
| 2013/0000232 A1 * | 1/2013 | Weiss | B32B 17/10055 | 52/656.1 |

* cited by examiner

*Primary Examiner* — Andrew J Triggs
(74) *Attorney, Agent, or Firm* — Goodwin Procter LLP

(57) ABSTRACT

An apparatus and a method for mulled window installation are described. An example window apparatus includes a mullion tube, a first window unit attached to a first side of the mullion tube, a second window unit attached to a second side of the mullion tube, a first mull clip disposed inside a first hollow end of the mullion tube, and a second mull clip disposed inside a second hollow end of the mullion tube. The first mull clip defines a first hole configured to receive a first screw through a first cutout in the mullion tube, and the second mull clip defines a second hole configured to receive a second screw through a second cutout in the mullion tube.

19 Claims, 10 Drawing Sheets

APPARATUS AND METHOD FOR MULLED WINDOW INSTALLATION

TECHNICAL FIELD

This disclosure generally relates to mulled windows and, in certain examples, to an apparatus and method for installing mulled windows.

BACKGROUND

Windows are an essential component of any building, providing ventilation, natural light, and aesthetic appeal. In many cases, windows are arranged in a group or series, referred to as "mulled windows," to fill a larger opening or to create a unique design element. Windows are often joined or mulled together at the jobsite. For example, individual window units and related hardware can be shipped to the jobsite where the windows are mulled and installed.

FIGS. 1A-1E illustrate an existing sequence of steps for mulling and installing two separate window units. FIG. 1A illustrates an example window rough opening 102 in a wall 104, with sheeting removed for clarity. The rough opening 102 is defined by a header 106*a*, a sill plate 106*b*, and side studs 114, and can have any desired size (e.g., to accommodate two 24 in ×48 in window units). FIG. 1B illustrates a first step in the installation process in which a mullion bar 108 is installed in the rough opening. The mullion bar 108 can be attached to the header 106*a* and the sill plate 106*b* using top and bottom installation brackets (e.g., "mull clips") and associated fasteners (e.g., 12 screws). FIG. 1C illustrates a step in which a first window unit 110 is attached to one side of the mullion bar 108 with fasteners (e.g., 4 screws). FIG. 1D illustrates a step in which a second window unit 112 is attached to an opposite side of the mullion bar 108 with fasteners (e.g., 4 screws). FIG. 1E illustrates a finishing step in which the installed window units may be weather-sealed and/or covered with one or more trim pieces.

The above-described approach for installing mulled windows has certain drawbacks. For example, one of the challenges with traditional mullion bar systems is that they can be time-consuming and challenging to install. They often require specialized tools and expertise, which can increase installation costs and reduce efficiency. Further, traditional mullion bar systems may not provide optimal structural support, which can impact the overall performance and durability of the windows.

Therefore, there is a need for an improved mulling system that is easy to install, provides optimal structural support, and enhances the overall performance of mulled windows.

SUMMARY

To address the aforementioned shortcomings, an apparatus and a method for installing mulled windows are provided. In certain examples, the window apparatus includes a mullion tube, a first window unit attached to a first side of the mullion tube, a second window unit attached to a second side of the mullion tube, a first mull clip disposed inside a first hollow end of the mullion tube, and a second mull clip disposed inside a second hollow end of the mullion tube. The first mull clip defines a first hole configured to receive a first screw through a first cutout in the mullion tube, and the second mull clip defines a second hole configured to receive a second screw through a second cutout in the mullion tube.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to some embodiments by way of illustration only. It should be noted that from the following discussion alternative embodiments of the structures and methods disclosed herein will be readily recognized as viable alternatives that may be employed without departing from the principles of the present disclosure.

Reference will now be made in detail to specific embodiments, examples of which are illustrated in the accompanying figures. It should be noted that wherever practicable similar or like reference numbers may be used in the figures and may indicate similar or like functionality. The figures depict embodiments of the disclosed window structures or window installation methods for purposes of illustration only. One skilled in the art will readily recognize from the following description that alternative embodiments of the structures and methods illustrated herein may be employed without departing from the principles described herein.

In general, the present disclosure relates to apparatus and methods that facilitate mulled window installation and improve overall performance of mulled windows. In certain examples, windows can be pre-mulled in a factory and shipped to jobsites for installation. The pre-mulled windows can be installed by driving screws through specifically designed brackets or clips (referred to herein as "mull clips") into structural members that define the window rough opening (e.g., a header, a sill plate, or side studs). Compared to previous approaches, the apparatus and methods described herein simplify the mulled window installation process and result in a more consistent installed product.

Figure 1A:
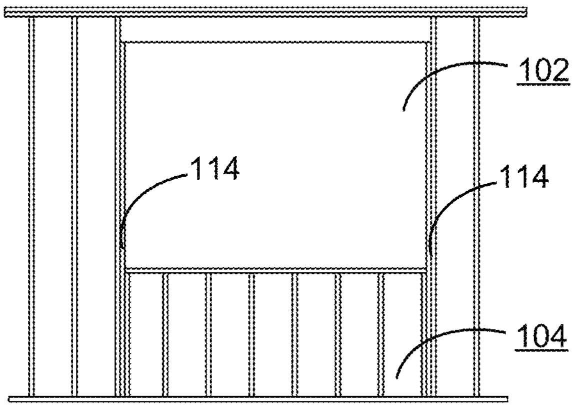
FIGS. 1A-1E illustrate an existing sequence of steps for mulling and installing two separate window units at a jobsite.
Figure 1B:
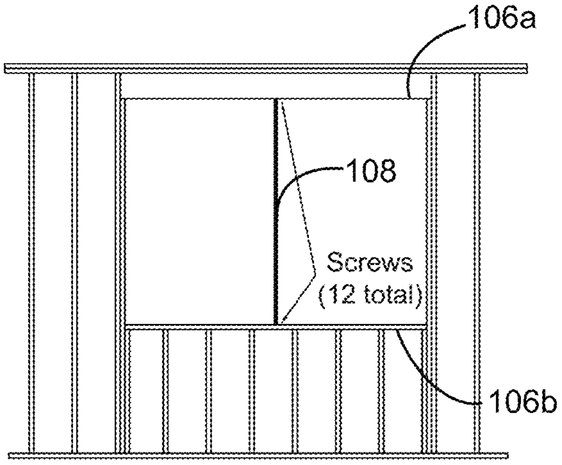
Figure 1C:
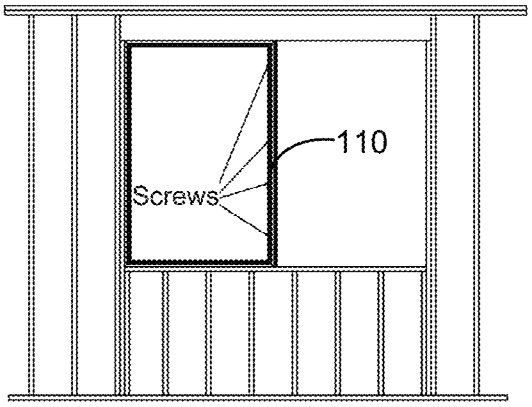
Figure 1D:
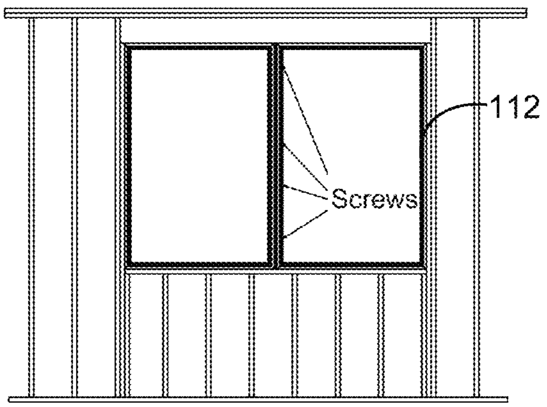
Figure 1E:
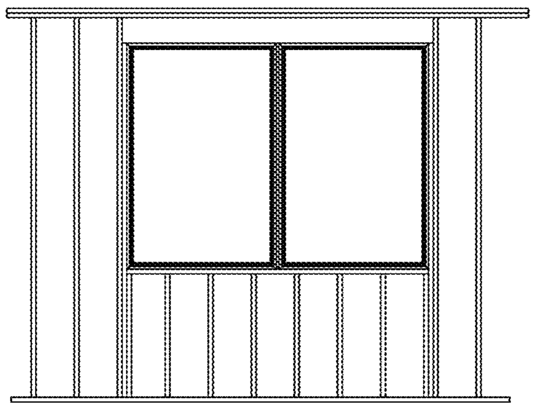
FIG. 1E (Prior Art)
Figure 2A:
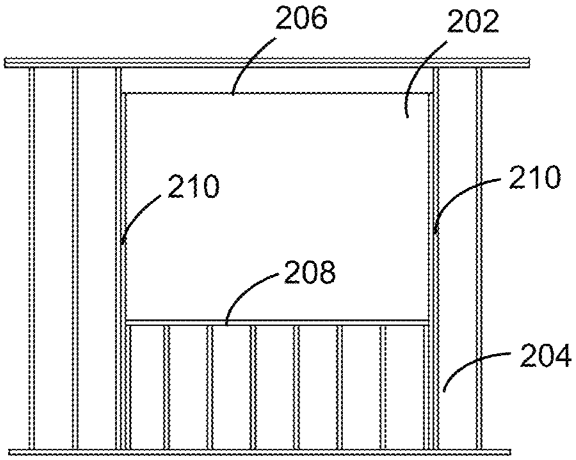
FIGS. 2A-2D illustrate a sequence of steps for installing a pre-mulled window, in accordance with certain embodiments.
Figure 2B:
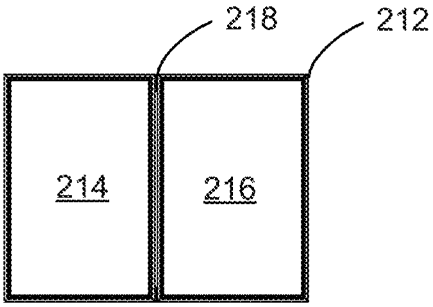
Figure 2C:
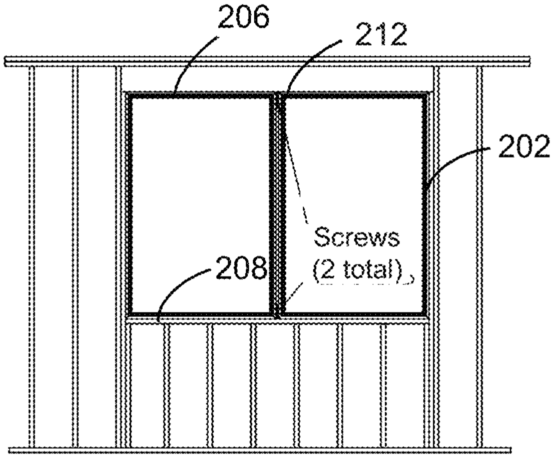
Figure 2D:
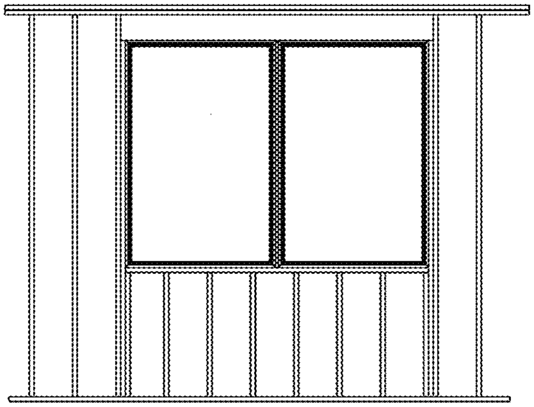

FIGS. 2A-2D illustrate a sequence of steps for installing pre-mulled windows, in accordance with the present disclosure. FIG. 2A illustrates an example window rough opening 202 in a wall 204, with sheeting removed for clarity. The rough opening 202 is defined by a header 206, a sill plate 208, and side studs 210, and can have any desired size (e.g., to accommodate two 24 in×48 in window units). FIG. 2B illustrates an example mulled window 212 that is available for installation in the rough opening 202. The mulled window 212 includes two window units 214 and 216 that have been pre-mulled together as a single unit in the factory. In one example, the two separate window units 214 and 216 are anchored to a mullion tube, mullion bar, or other reinforcing structure 218, using an adhesive (e.g., silicone) and/or mechanical fasteners (e.g., screws). FIG. 2C illustrates a step in which the mulled window 212 is installed in the rough opening 202. As described herein, the mulled window 212 can be anchored to the header 206 and the sill plate 208 using mull clips and fasteners (not shown). For example, a mull clip and a single screw can be used to secure each end of the mullion tube 218 to the header 206 and the sill plate 208. FIG. 2D illustrates an example finishing step in which the installed window may be weather-sealed and/or covered with one or more trim pieces (e.g., "mull caps") to hide installation hardware and render a single frame appearance.

In some embodiments, the above-described approach can be used to install other pre-mulled window arrangements, such as, for example, three or more pre-mulled window units and/or window units that are pre-mulled in a vertical stack (e.g., one window above another window). The number of mullion bars and mull clips needed for the installation can depend on the number of window units in a pre-mulled window. For example, when a pre-mulled window contains N window units arranged in a row or column, the installation may utilize N−1 mullion tubes and (N−1)×2 mull clips, with one screw per mull clip.

Figure 2E:
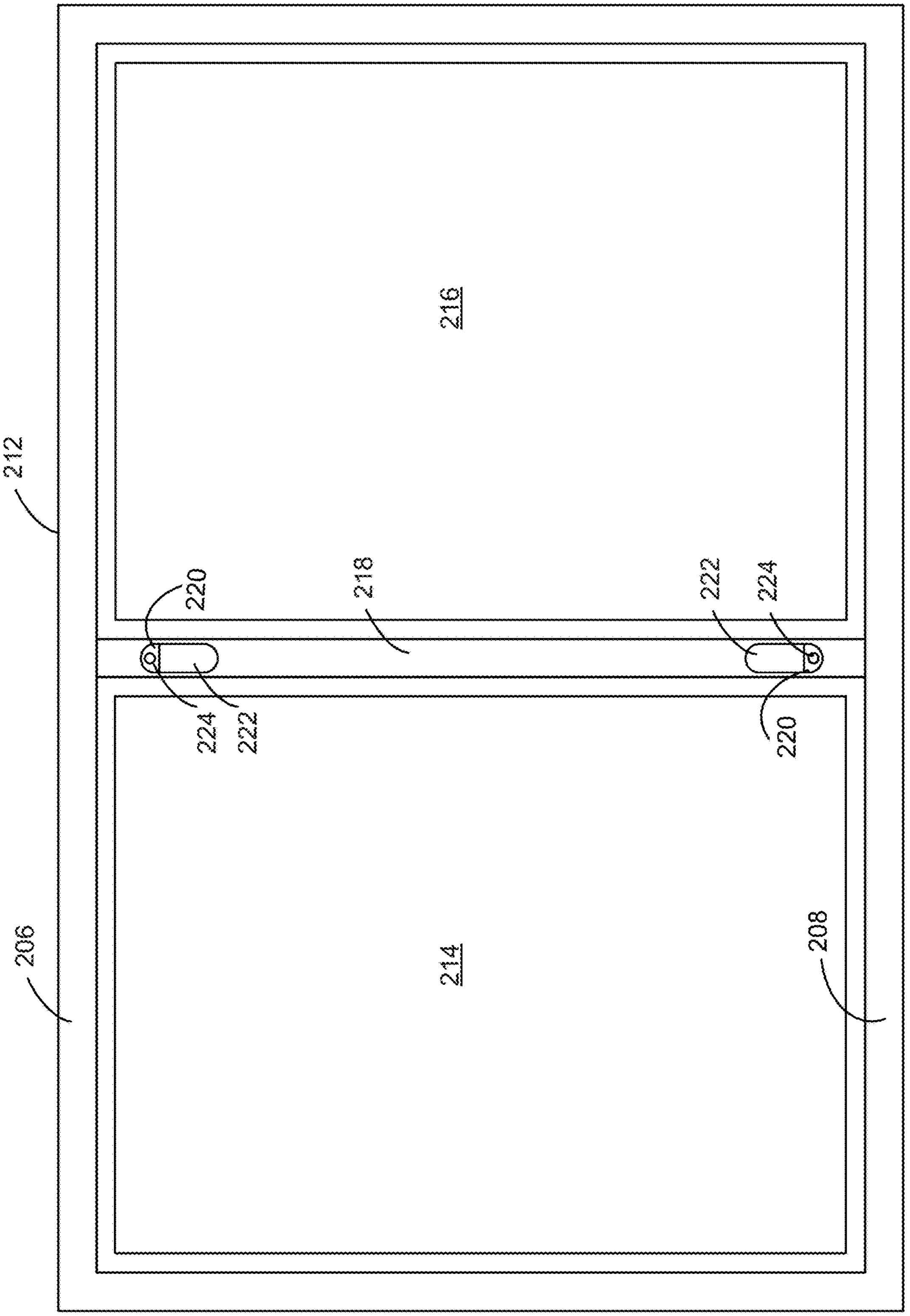
FIG. 2E is a schematic front view of a mulled window installed in a rough opening, in accordance with certain embodiments.

FIG. 2E is a schematic front view of a mulled window 212 installed in a rough opening, in accordance with certain embodiments. The mulled window 212 includes a first window unit 214 and a second window unit 216 attached to a mullion tube 218. A mull clip 220 is inserted into each end of the mullion tube 218 and is accessible through a respective cutout 222 in the mullion tube 218. Each mull clip 220 includes a hole 224 that guides a fastener (e.g., a screw) towards either a header 206 or a sill plate 208 defining the rough opening. For example, a screw can be inserted through the cutout 222 and into the hole 224 in the top mull clip 220 to secure the top mull clip 220 to the header 206.

Likewise, a screw can be inserted through the cutout 222 and into the hole 224 in the bottom mull clip 220 to secure the bottom mull clip 220 to the sill plate 208. The cutouts 222 are sized to permit a tool (e.g., a screwdriver, a drill, or a drill bit) to access the screw when securing the mull clips 220 to the header 206 and the sill plate 208.

Figure 3B:
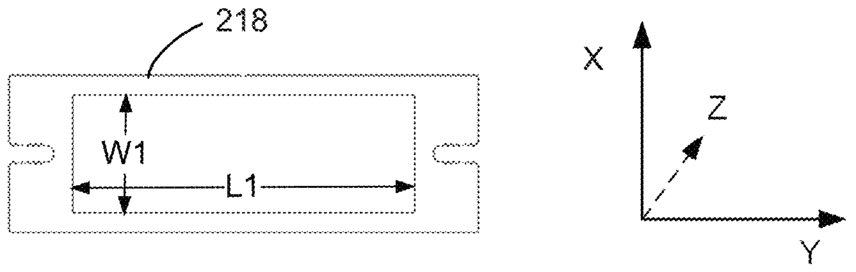
FIG. 3B is a top, cross-sectional view of a mullion tube, in accordance with certain embodiments.
Figure 3A:
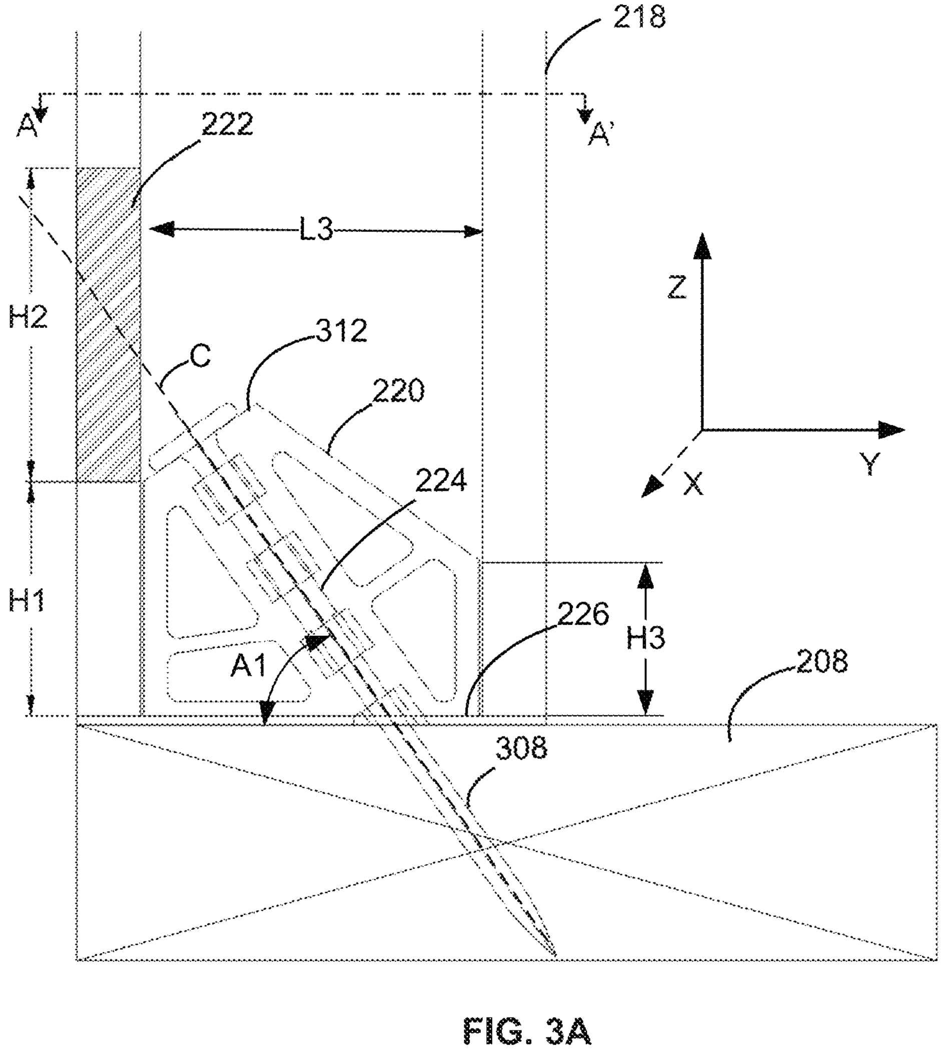
FIG. 3A is a side, cross-sectional view of a mullion tube anchored to a sill plate using a mull clip, in accordance with certain embodiments.
Figure 4C:
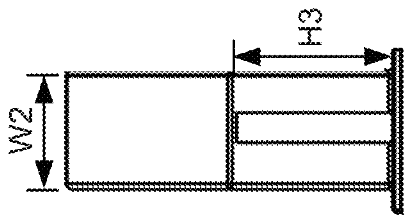
FIG. 4C is a back view of the mull clip of FIG. 4A, in accordance with certain embodiments.
Figure 4D:
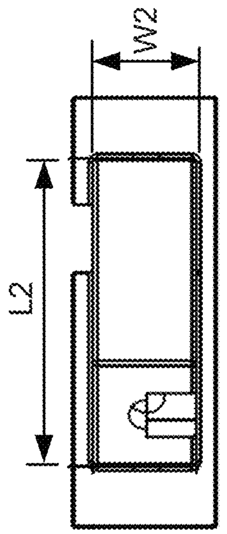
FIG. 4D is a top view of the mull clip of FIG. 4A, in accordance with certain embodiments.
Figure 4A:
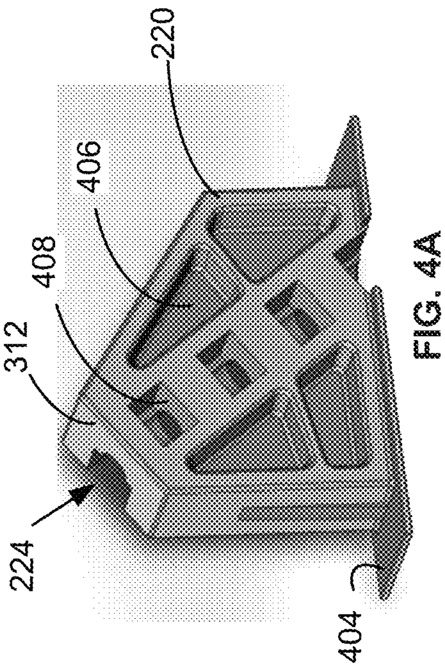
FIG. 4A is a perspective view of a mull clip, in accordance with certain embodiments.
Figure 4E:
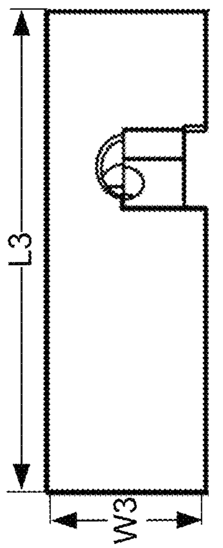
FIG. 4E is a bottom view of the mull clip of FIG. 4A, in accordance with certain embodiments.
Figure 4B:
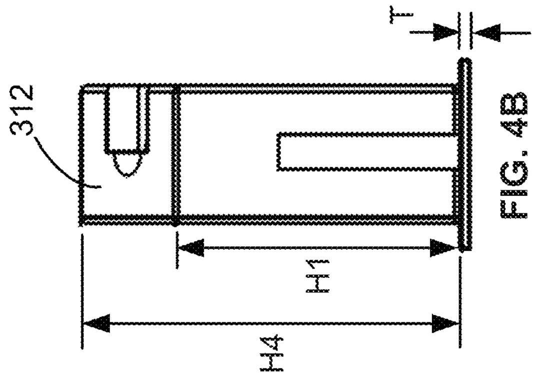
FIG. 4B is a front view of the mull clip of FIG. 4A, in accordance with certain embodiments.
Figure 5A:
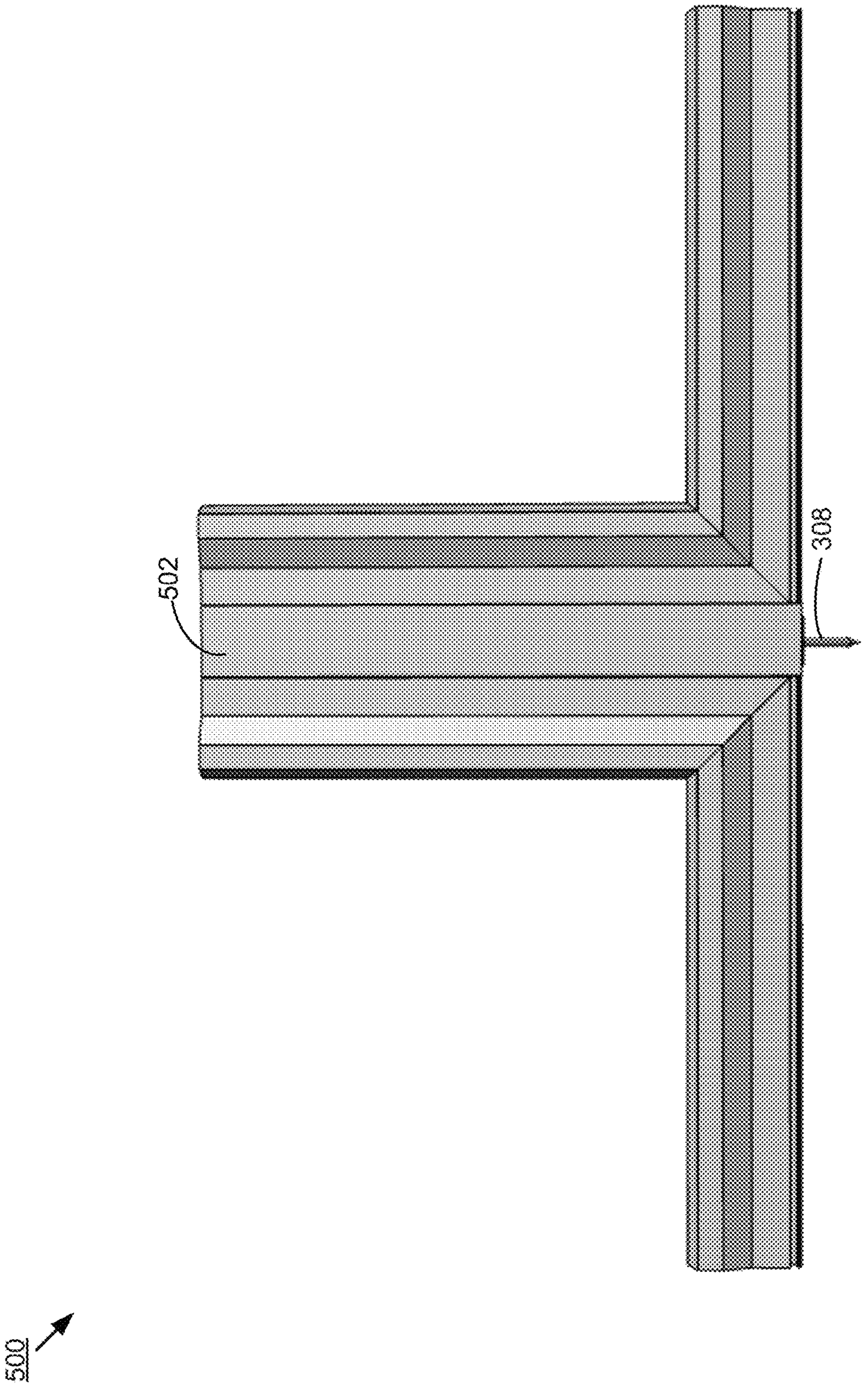
FIG. 5A is a cutaway, front view of a bottom portion of a mulled window, in accordance with certain embodiments.
Figure 5B:
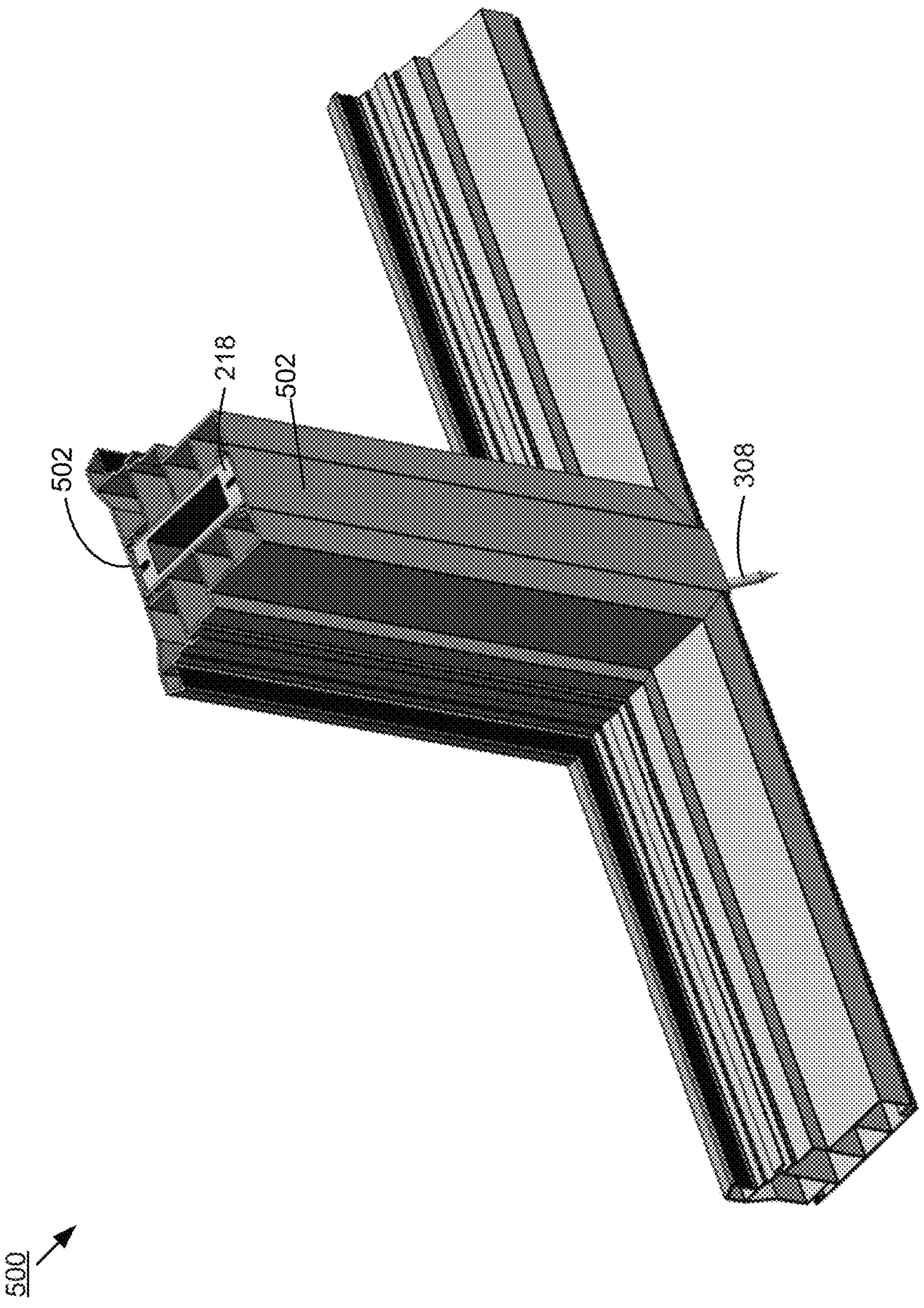
FIG. 5B is a cutaway, perspective view of a bottom portion of a mulled window, in accordance with certain embodiments.
Figure 5C:
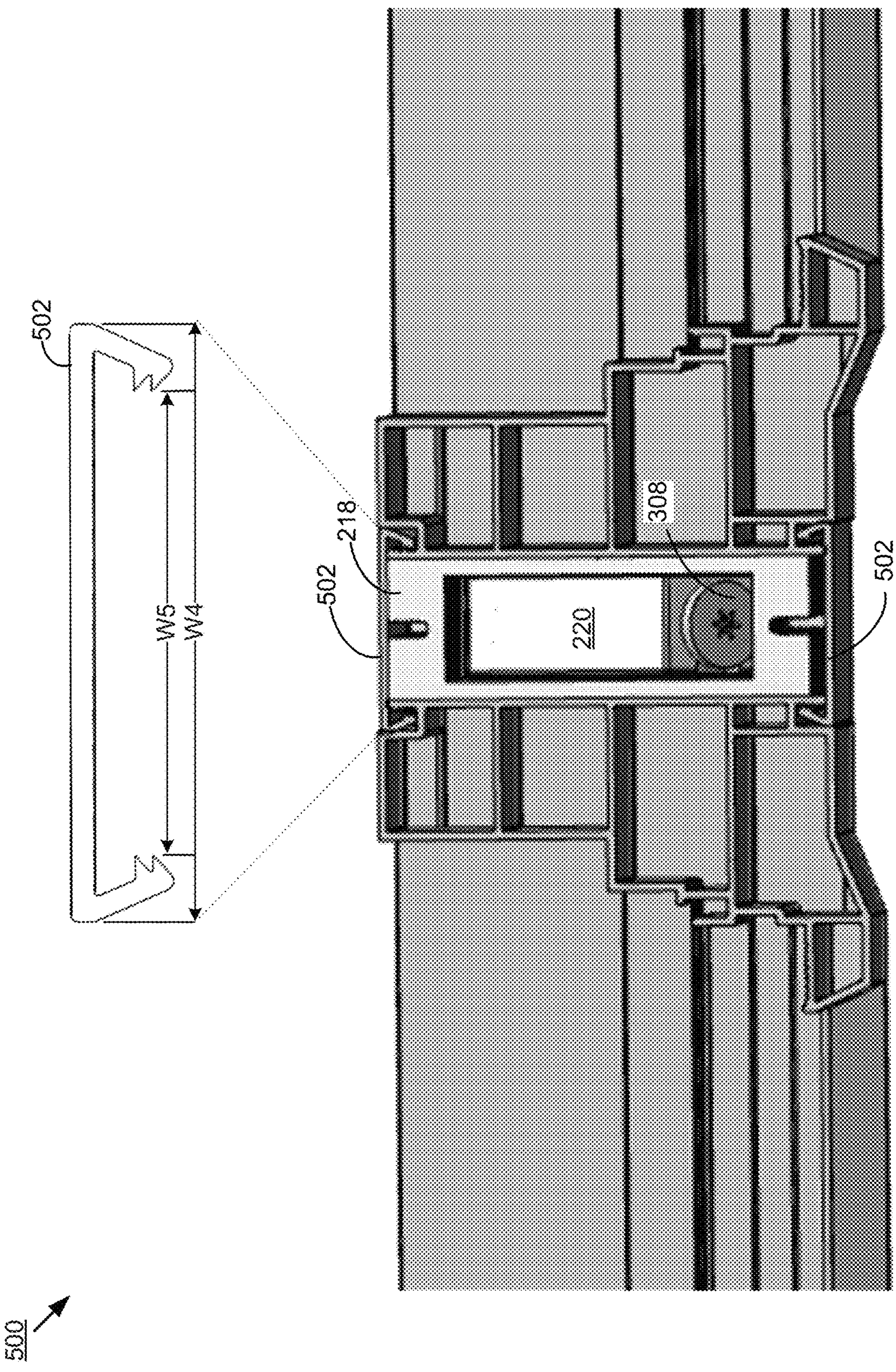
FIG. 5C is a cutaway, top view of a bottom portion of a mulled window, in accordance with certain embodiments.
Figure 5D:
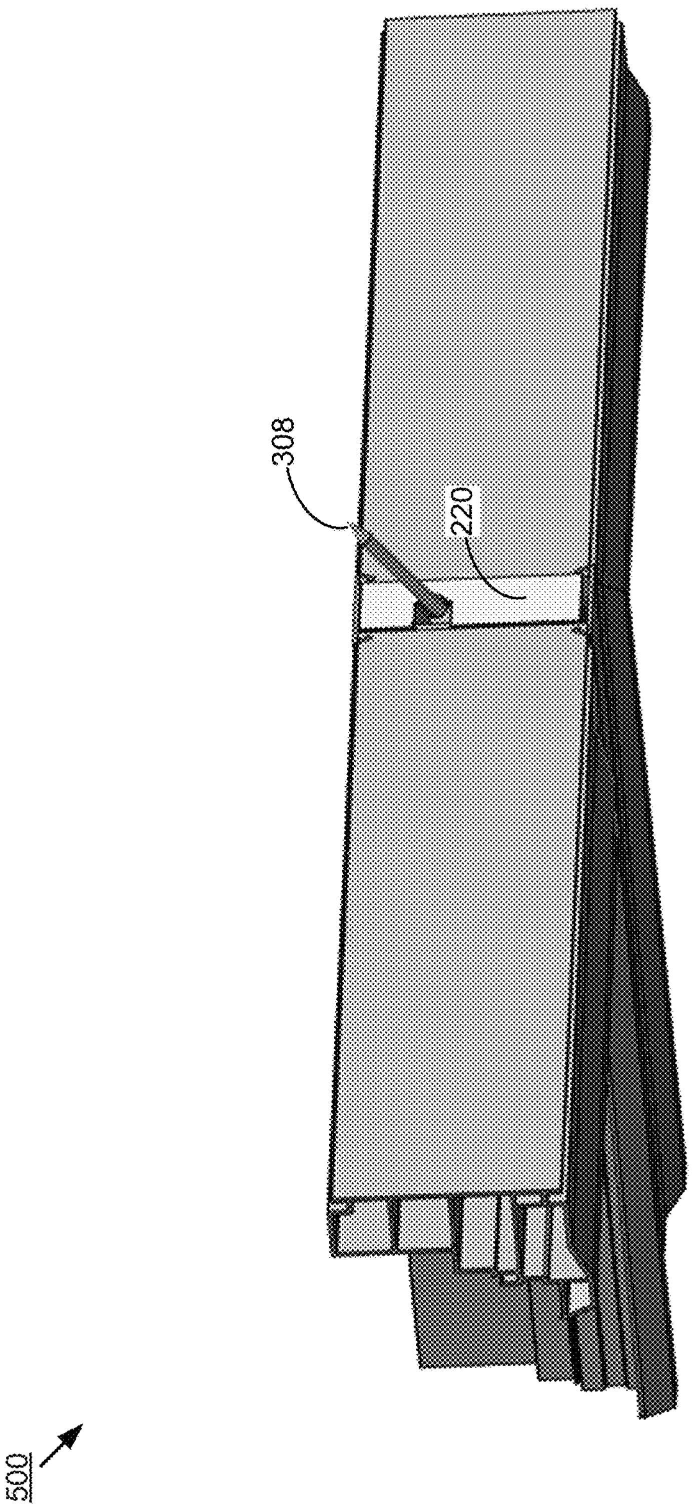
FIG. 5D is a cutaway, bottom perspective view of a bottom portion of a mulled window, in accordance with certain embodiments.

FIG. 3A is a side, cross-sectional view of the mullion tube 218 anchored to a sill plate 208 (or a header, side stud, or other structural member) using the mull clip 220, and FIG. 3B is a top, cross-sectional view of the mullion tube 218, in accordance with certain examples. The x and y-axes in these figures can represent a horizontal plane and the z-axis can represent a vertical direction.

In the depicted example, the mull clip 220 is disposed inside a bottom end of the mullion tube 218. The mull clip 220 defines the interior hole 224 for guiding and holding a screw 308 (e.g., a 4" deck screw) when the mullion tube 218 is anchored to the sill plate 208 (e.g., a wood substrate). As shown in FIG. 3A, instead of guiding the screw 308 perpendicularly into the sill plate 208, a center axis C of the hole 224 forms an angle A1 with the sill plate 208 or a bottom surface 226 of the mull clip 220. The angle A1 can be, for example, from about 40 degrees to about 60 degrees, or about 55.5 degrees. In some examples, the angle A1 can enable a window installer to insert and drive the screw 308 through the cutout 222 in the mullion tube 218.

Referring to FIG. 3B, the portion of the mull clip 220 that is inserted into the mullion tube 218 can have a cross-section that matches an interior cross-section of the mullion tube 218. For example, a length and a width of the inserted portion can be approximately equal to or slightly less than a length L1 and a width W1, respectively, of the interior cross-section of the mullion tube 218. In some implementations, the inserted portion can have a slight taper that makes it easier to achieve the insertion and/or provides a tight fit once inserted.

In various examples, a wide range of dimensions can be suitable for the mull clip 220 and the mullion tube 218. In the depicted example, a front side of the mull clip 220 can have a height H1 that is approximately equal to a distance between the cutout 222 and the bottom edge of the mullion tube 218. A height H2 of the cutout 222 is preferably large enough to allow an installer to access the screw 308 with a tool (e.g., a screwdriver or drill). In one example, the height H2 is large enough so that the center axis C of the hole 224 in the mull clip 220 passes through the cutout 222 (e.g., at or near a center of the cutout 222). A back side of the mull clip 220 can have a height H3 that is shorter than the front side height H1. This can make the mull clip 220 tall enough on the front side to receive and guide the screw 308, but shorter on the back side to reduce a weight and/or material cost of the mull clip 220. Additionally or alternatively, the mull clip 220 can include one or more voids or cavities that can further reduce the weight and material cost. A face 312 of the mull clip 220 at or around the hole 224 can be perpendicular to the center axis C of the hole 224. This can allow a head of the screw to lay flat on the face 312, when securing the mull clip 220 to the sill plate 208 or other structural member.

FIGS. 4A-4E illustrate a variety of views of the mull clip 220, in accordance with certain examples. As illustrated, the mull clip 220 may include a flange 404, which may contact a bottom or top edge or end of a mullion tube (e.g., mullion tube 218) when the mull clip 220 is inserted into the mullion tube. The inserted portion of the mull clip 220 may have a length L2, a width W2, a front face height H1, a back face height H3, and a total height H4. The length L2 can be, for example, from about 25 mm to about 120 mm, or about 55.5 mm. The width W2 can be, for example, from about 9.5 mm to about 38.5 mm, or about 18.4 mm. The height H1 can be, for example, from about 15 mm to about 60 mm, or about 39 mm. The height H3 can be, for example, from about 12.25 mm to about 36.5 mm, or about 24.25 mm. The height H4 can be, for example, from about 15.5 mm to about 60.5 mm, or about 49.6 mm. The flange 404 can have a length L3, a width W3, and a thickness T. The length L3 can be, for example, from about 35 mm to about 140 mm, or about 76.15 mm. The width W3 can be, for example, from about 12 mm to about 50 mm, or about 25.45 mm. The thickness T can be, for example, from about 0.8 mm to about 2.5 mm, or about 1.7 mm. Additionally or alternatively, the mull clip 220 may include one or more cavities 406 and/or voids 408, which can reduce the weight and/or material cost of the mull clip 220 and/or can simplify a mold operation during manufacture of the mull clip 220. In the depicted example, the mull clip 220 includes the hole 224 for receiving and/or guiding the screw 308 into an adjacent structural member (e.g., a header or sill plate). The hole 224 intersects the face 312, which is perpendicular to the hole 224.

The mull clip 220 can be made of a variety of different materials, including, for example, metallic materials (e.g., aluminum) and/or polymeric materials, such as, for example, NYLON 6 (polyamide 6) or PVC, alone or in any combination. The mull clip 220 can be made of a single material or a blend or combination of materials. The mull clip 220 can have a unitary construction.

FIGS. 5A-5D include cutaway views of a bottom portion of an installed mulled window system 500. The window system 500 includes the mullion tube 218, the mull clip 220, the screw 308, and structural components for two windows (e.g., stiles and rails). The window system also includes mull caps 502 installed over front and back sides of the mullion tube 218. The mull caps 502 can provide a finished look and/or provide structural support for the window system 500. The mull cap 502 may have an overall width W4 and a holding width W5, as shown in the insert in FIG. 5C. The overall width W4 can be, for example, from about 18.5 mm to about 75 mm, or about 37.2 mm. The holding width W5 can be, for example, from about 14.5 mm to about 58 mm, or about 28.9 mm.

Figure 6:
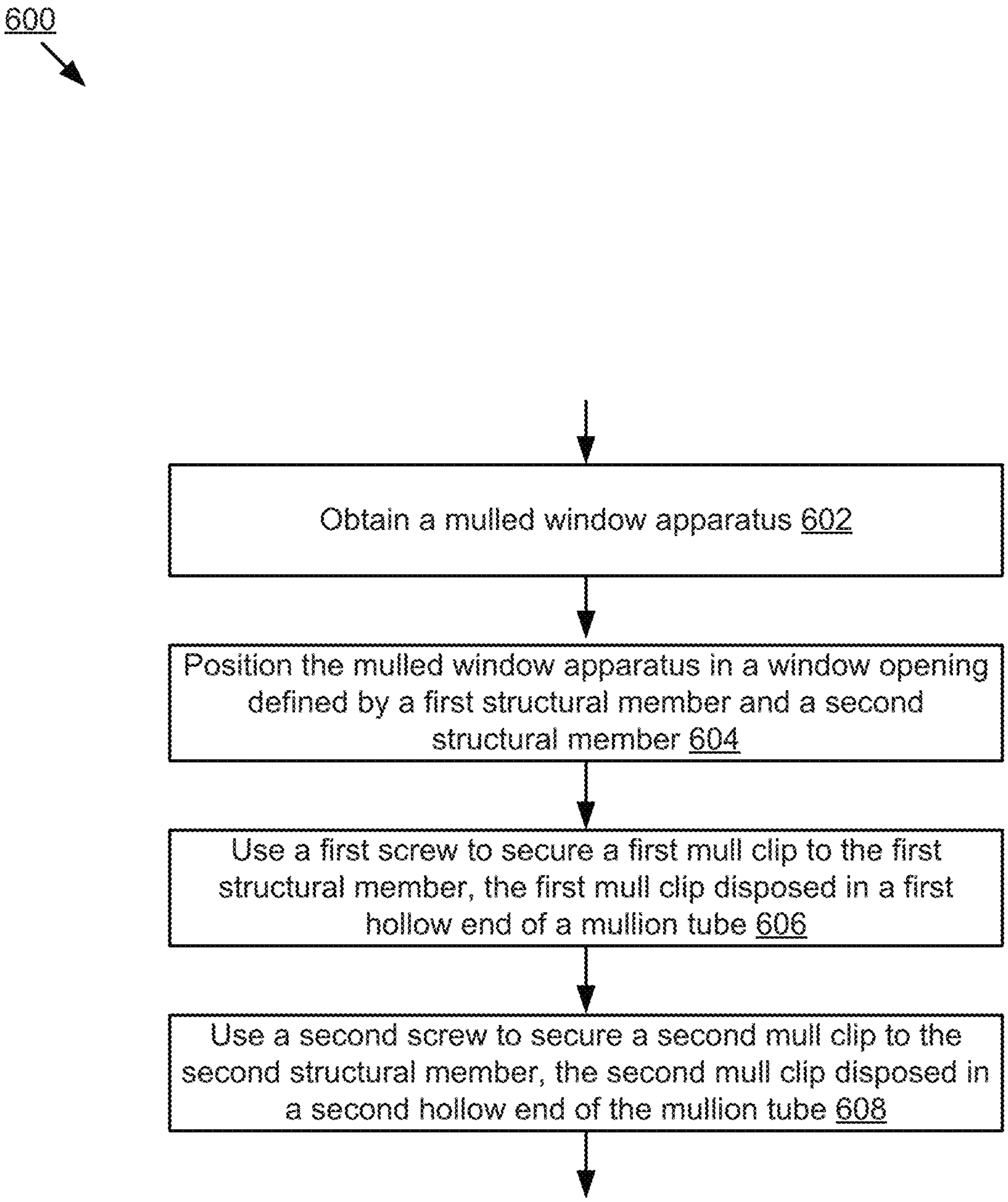
FIG. 6 illustrates a flow chart of a method of installing a pre-mulled window, in accordance with certain embodiments.

Referring now to FIG. 6, an example method 600 for installing a mulled window is further described. According to one embodiment, method 600 includes a first step 602 of obtaining a mulled window apparatus. The mulled window apparatus may be or include any of the mulled windows described above. In one example, the mulled window apparatus includes a mullion tube, a first window unit attached (e.g., with adhesive) to a first side of the mullion tube (e.g., mullion tube 218), and a second window unit attached to a second side of the mullion tube. In some embodiments, the first window unit and the second window unit are mulled together as a single piece before the window apparatus is shipped to a jobsite for installation. Two mull clips (e.g., the mull clip 220) may be inserted into two opposite hollow ends of the mullion tube before or after the window apparatus arrives at the jobsite.

Method 600 further includes a step 604 of positioning the mulled window apparatus in a window rough opening defined by a first structural member (e.g., the header 206 or a first side stud) and a second structural member (e.g., the sill plate 208 or a second side stud opposite the first side stud). The mulled window apparatus obtained in step 602 may have a size matching a size of the window rough opening, and thus may fit in the rough opening with minimal gaps between the mulled window apparatus and the rough opening.

Method 600 further includes a step 606 of using a first screw (e.g., the screw 308) to secure a first mull clip of the two mull clips to the first structural member (e.g., the header 206 or the first side stud). The first mull clip is disposed in a first hollow end of the mullion tube, and the first mull clip defines a first hole (e.g., the hole 224) configured to receive the first screw through a first cutout (e.g., the cutout 222) in the mullion tube. The first cutout provides access to drive the first screw through the first mull clip and into the first structural member, thereby securing the mulled window apparatus to the first structural member.

Method 600 further includes a step 608 of using a second screw to secure a second mull clip of the two mull clips to the second structural member (e.g., the sill plate 208 or the second side stud). The second mull clip is disposed in a second hollow end of the mullion tube, and the second mull clip defines a second hole configured to receive the second screw through a second cutout in the mullion tube. The second cutout provides access to drive the second screw through the second mull clip and into the second structural member, thereby securing the mulled window apparatus to the second structural member. Once secured, any gaps around the mulled window apparatus can be sealed. One or more trim pieces (e.g., mull caps 502) can be installed to provide a finished look.

The steps for method 600 are not limited to the order in which they are described above. For example, step 608 may be performed before step 606.

Example low, high, and typical values for various parameters described herein are provided in Table 1. Each listed value or value within a listed range can be a minimum, maximum, or average value. Various embodiments include any parameter value (e.g., integer or decimal value) within the cited ranges. For example, the height H1 can be greater than, greater than or equal to, less than, less than or equal to, or equal to about 15 mm, 16 mm, 17 mm, . . . , 59 mm, or 60 mm. Likewise, the length L1 can be greater than, greater than or equal to, less than, less than or equal to, or equal to about 25 mm, 26 mm, 27 mm, . . . , 119 mm, or 120 mm. Express support and written description of these parameter values for each parameter are hereby represented.

TABLE 1

Exemplary parameters for the mulled window apparatus.

| Parameter | Low | Typical | High |
|---|---|---|---|
| Length L1 of interior cross-section of mullion tube (mm) | 25 | 55.5 | 120 |
| Length L2 of mull clip (mm) | 25 | 55.5 | 120 |
| Length L3 of mull clip flange (mm) | 35 | 76.15 | 140 |
| Width W1 of interior cross-section of mullion tube (mm) | 10 | 19.15 | 40 |
| Width W2 of mull clip (mm) | 9.5 | 18.4 | 38.5 |
| Width W3 of mull clip flange (mm) | 12 | 25.45 | 50 |
| Overall width W4 of mull cap (mm) | 18.5 | 37.2 | 75 |
| Holding width W5 of mull cap (mm) | 14.5 | 28.9 | 58 |
| Front face height H1 of mull clip (mm) | 15 | 39 | 60 |
| Height H2 of cutout in mullion tube (mm) | 25.4 | 50.8 | 76.2 |
| Back face height H3 of mull clip (mm) | 12.25 | 24.25 | 36.5 |
| Total height H4 of mull clip (mm) | 15.5 | 49.6 | 60.5 |
| Thickness T of mull clip flange (mm) | 0.8 | 1.7 | 2.5 |
| Angle Al between hole axis and sill plate/header (degrees) | 40 | 55.5 | 60 |

The construction and arrangement of the elements of the apparatus as shown in the exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited.

Further, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes, and omissions may be made in the design, operating conditions, and arrangement of the exemplary embodiments without departing from the spirit of the present subject matter.

The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

It should be also understood that as used in the description herein and throughout the claims that follow, the meaning of "a." "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention.

What is claimed is:

1. A window apparatus comprising:
a mullion tube;
a first window unit attached to a first side of the mullion tube;
a second window unit attached to a second side of the mullion tube, the first side opposite the second side;
a first mull clip disposed at least partially inside a first hollow end of the mullion tube, the first mull clip defining a first hole configured to receive a first screw through a first cutout in the mullion tube; and
a second mull clip disposed at least partially inside a second hollow end of the mullion tube, the second mull clip defining a second hole configured to receive a second screw through a second cutout in the mullion tube,
wherein each of the first cutout and the second cutout is located on either a front side or a back side of the mullion tube,
wherein the first hole is configured to guide the first screw into a first structural member defining a window opening,
wherein the second hole is configured to guide the second screw into a second structural member defining the window opening, and
wherein at least one of the first structural member or the second structural member comprises a sill plate or a header.

2. The window apparatus of claim 1, wherein the first window unit and the second window unit are attached to the mullion tube with adhesive.

3. The window apparatus of claim 1, wherein the mullion tube has a rectangular cross-section defining the first side, the second side, the front side, and the back side.

4. The window apparatus of claim 1, further comprising a mull cap covering the front side.

5. The window apparatus of claim 1, wherein a center axis of the first hole forms an angle with the first structural member, and wherein the angle is from about 40° to about 60°.

6. The window apparatus of claim 1, wherein a center axis of the first hole passes through the first cutout, and wherein a center axis of the second hole passes through the second cutout.

7. The window apparatus of claim 1, wherein the first mull clip comprises an outer surface that defines the first hole, and wherein a center axis of the first hole is perpendicular to the outer surface.

8. The window apparatus of claim 1, wherein the first mull clip comprises a flange that contacts the first hollow end of the mullion tube, and wherein the second mull clip comprises a flange that contacts the second hollow end of the mullion tube.

9. The window apparatus of claim 1, wherein the first cutout and the second cutout are located on the front side of the mullion tube.

10. The window apparatus of claim 1, wherein the at least one of the first structural member or the second structural member comprises the sill plate.

11. The window apparatus of claim 1, wherein the at least one of the first structural member or the second structural member comprises the header.

12. A method of installing a window, the method comprising:

obtaining a mulled window apparatus comprising:

a mullion tube;

a first window unit attached to a first side of the mullion tube; and a second window unit attached to a second side of the mullion tube, the first side opposite the second side;

positioning the mulled window apparatus in a window opening defined by a first structural member and a second structural member;

using a first screw to secure a first mull clip to the first structural member, the first mull clip disposed at least partially in a first hollow end of the mullion tube, the first mull clip defining a first hole configured to (i) receive the first screw through a first cutout in the mullion tube and (ii) guide the first screw into the first structural member; and using a second screw to secure a second mull clip to the second structural member, the second mull clip disposed at least partially in a second hollow end of the mullion tube, the second mull clip defining a second hole configured to (i) receive the second screw through a second cutout in the mullion tube and (ii) guide the second screw into the second structural member, wherein each of the first cutout and the second cutout is located on either a front side or a back side of the mullion tube, and wherein at least one of the first structural member or the second structural member comprises a sill plate or a header.

13. The method of claim 12, wherein the mullion tube has a rectangular cross-section defining the first side, the second side, the front side, and the back side.

14. The method of claim 12, further comprising covering the front side with a mull cap.

15. The method of claim 12, wherein using the first screw to secure the first mull clip comprises accessing the first screw through the first cutout, and wherein using the second screw to secure the second mull clip comprises accessing the second screw through the second cutout.

16. The method of claim 12, wherein using the first screw comprises inserting at least one of a screwdriver or a drill bit through the first cutout.

17. The method of claim 12, wherein a center axis of the first hole passes through the first cutout, and wherein a center axis of the second hole passes through the second cutout.

18. The method of claim 12, wherein a center axis of the first hole forms an angle with the first structural member, and wherein the angle is from about 40° to about 60°.

19. The method of claim 12, wherein the first mull clip comprises an outer surface that defines the first hole, and wherein a center axis of the first hole is perpendicular to the outer surface.

* * * * *